F. W. SIREN AND E. TAVASTILA.
BELT SHIFTING DEVICE.
APPLICATION FILED FEB. 24, 1919.

1,311,095.

Patented July 22, 1919.
2 SHEETS—SHEET 1.

Witness
Chas. W. Stauffiger
Karl H. Butler

Inventor
Frank W. Siren,
Emil Tavastila,
By
Attorneys

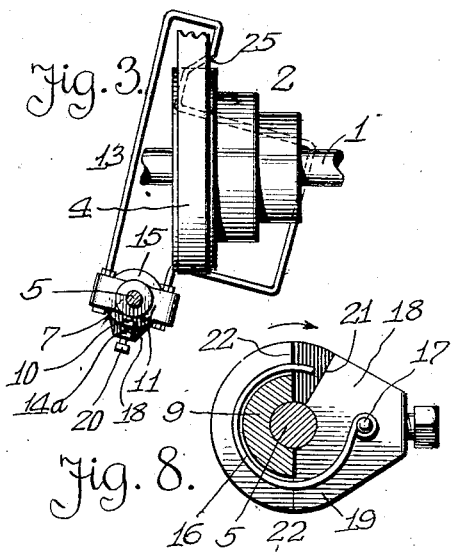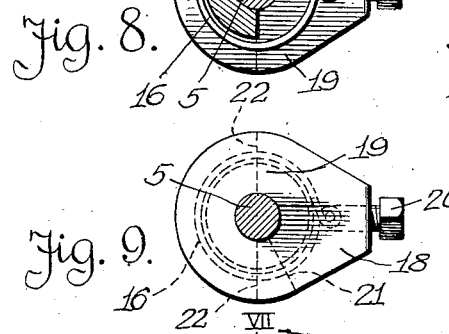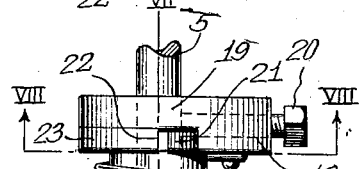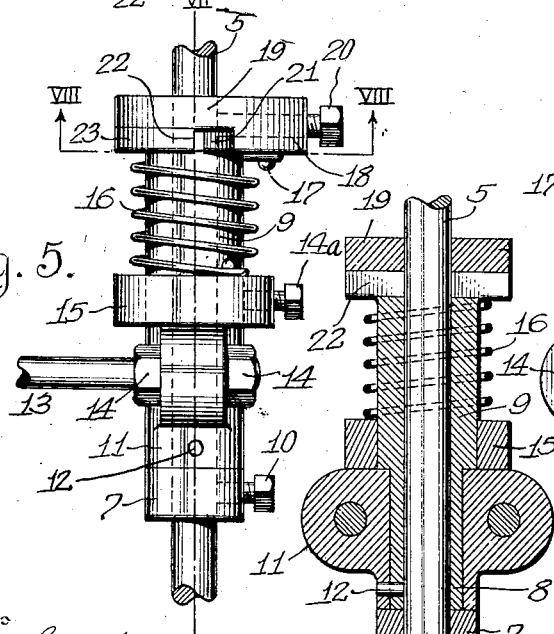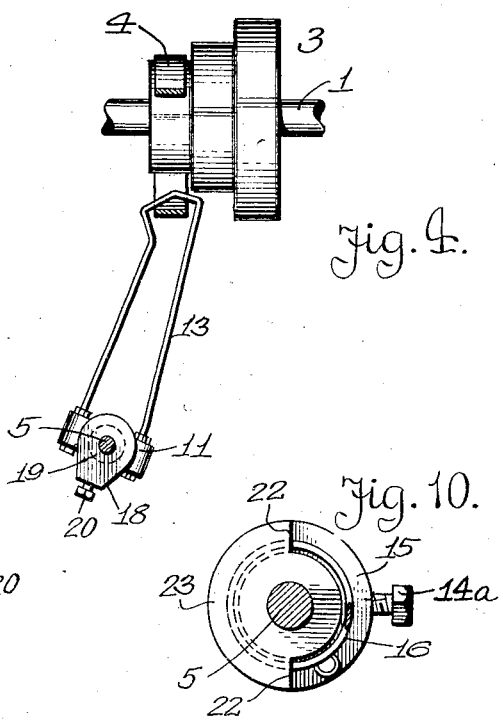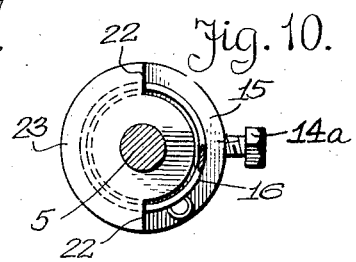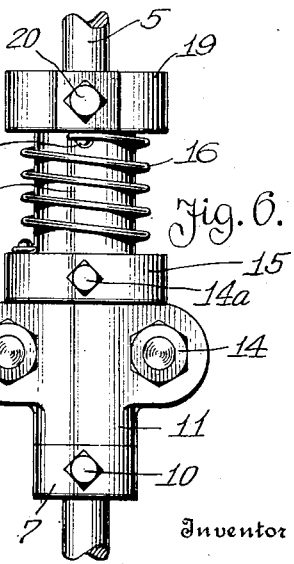

UNITED STATES PATENT OFFICE.

FRANK W. SIREN, OF DETROIT, MICHIGAN, AND EMIL TAVASTILA, OF DONORA, PENNSYLVANIA.

BELT-SHIFTING DEVICE.

1,311,095.

Specification of Letters Patent. Patented July 22, 1919.

Application filed February 24, 1919. Serial No. 278,718.

*To all whom it may concern:*

Be it known that we, FRANK W. SIREN and EMIL TAVASTILA, citizens of the United States of America, and residing at Detroit, county of Wayne, State of Michigan, and at Donora, county of Washington, State of Pennsylvania, respectively, have invented certain new and useful Improvements in Belt-Shifting Devices, of which the following is a specification, reference being had therein to the accompanying drawings.

Our invention aims to provide a belt shifting device wherein positive and reliable means are employed in a manner as hereinafter set forth, for accurately and expeditiously shifting a belt or flexible power transmission member relative to cone pulleys or other wheels, so that it will be unnecessary for an artisan to use his hands, a stick or other object in proximity to the belt to transfer the same, thereby eliminating danger of the hands and clothing being caught between the belt and pulleys and the artisan injured.

Our invention further aims to provide a belt shifting device including novel belt shifting arms arranged so that either may be positively actuated and the other arm automatically actuated, the latter closely following the former, so that a belt may be bodily shifted.

Our invention still further aims to provide a simple, durable, inexpensive and easily installed belt shifting device that will be hereinafter specifically described and then claimed, and reference will now be had to the drawings, wherein Figure 1 is a front elevation of the belt shifting device;

Fig. 2 is a side elevation of the same;

Fig. 3 is a cross sectional view taken on the line III—III of Fig. 2;

Fig. 4 is a similar view taken on the line IV—IV of Fig. 2;

Figure 1:
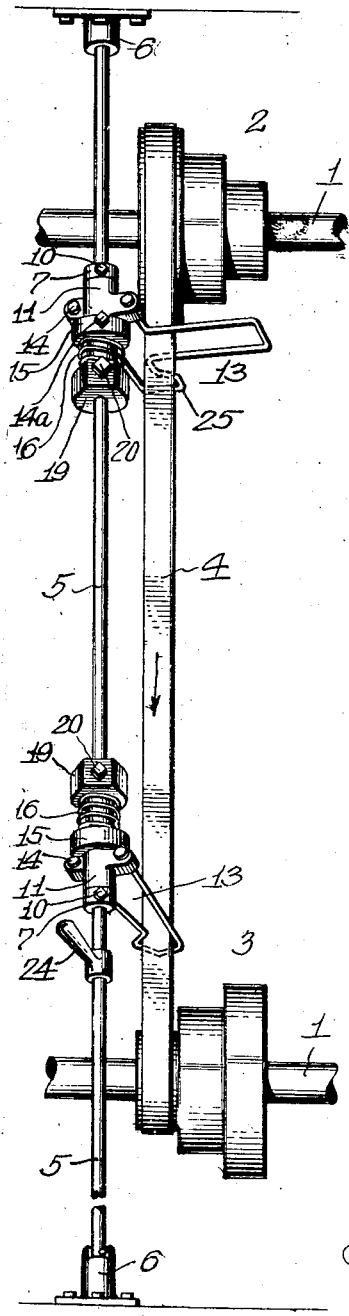

Fig. 5 is an enlarged side elevation of arm supporting and actuating mechanism;

Fig. 6 is a front elevation of the same;

Fig. 7 is a longitudinal sectional view of the arm supporting and actuating mechanism;

Fig. 8 is a horizontal sectional view taken on the line VIII—VIII of Fig. 5;

Fig. 9 is a plan of the mechanism, and

Fig. 10 is a plan of a sleeve forming part of the mechanism.

In order that the operation of the belt shifting device may be readily understood, we have shown in the drawings, two shafts 1 provided with cone pulleys 2 and 3 supporting a shiftable belt or power transmission member 4, the belt 4 of the cone pulleys 2 and 3 being such that either shaft may be driven at three speeds relative to the other shaft. It is in this connection, however, that our invention is not limited to the specific type of pulley nor the belt or power transmission member to be shifted by the device.

Adjacent the belt 4 is a rotatable upright 5 and this upright may have its ends rotatable in suitable bearings 6 carried by the floor and ceiling of the room or shop in which the shafts 1 are operated.

On the rotatable upright 5, adjacent the pulleys 2 and 3, are belt actuating mechanisms identical in construction, with the exception of the belt arms carried thereby and the fact that one of the mechanisms is disposed the reverse of the other, so it is thought that a detail description of one of the mechanisms will suffice for an understanding of the other.

On the rotatable upright 5 is a collar 7 adjustably maintained thereon by a set screw 10. Bearing on the collar 7 and surrounding the upright 5 is the reduced end 8 of a sleeve 9, and mounted on said sleeve is a winged support 11. The support 11 may be fixed on the reduced end 8 of the sleeve 9 by a pin 12 or other fastening means, and said support is provided with a belt shifting arm 13 which is preferably made of a rigid rod bent to desired form with its ends connected to the wings of the support 11, as at 14. The rod 13 for the cone pulley 3 has a special shape different from the shape of the belt shifting arm 13 associated with the cone pulley 2, and these belt shifting arms will be hereinafter referred to.

Fixed on the sleeve 9, above the support 11 by a set screw 14 or other fastening means is a collar 15 and attached to the upper face of said collar is the lower convolution of a coiled spring 16 surrounding the sleeve 9. The upper convolution of the spring 16 is attached, as at 17, to the depending portion 18 of another collar 19, said collar being fixed on the rotatable upright 5 by a set screw 20 or other fastening means.

The depending portion 18 of the collar 19 provides shoulders 21 confronting shoulders 22 provided by a semi-circular flange 23 on the upper end of the sleeve 9, and the shoulders 21 and 22 coöperate in limiting the movement of the sleeve 9 relative to the collar 19 and the rotatable upright 5.

Figure 2:
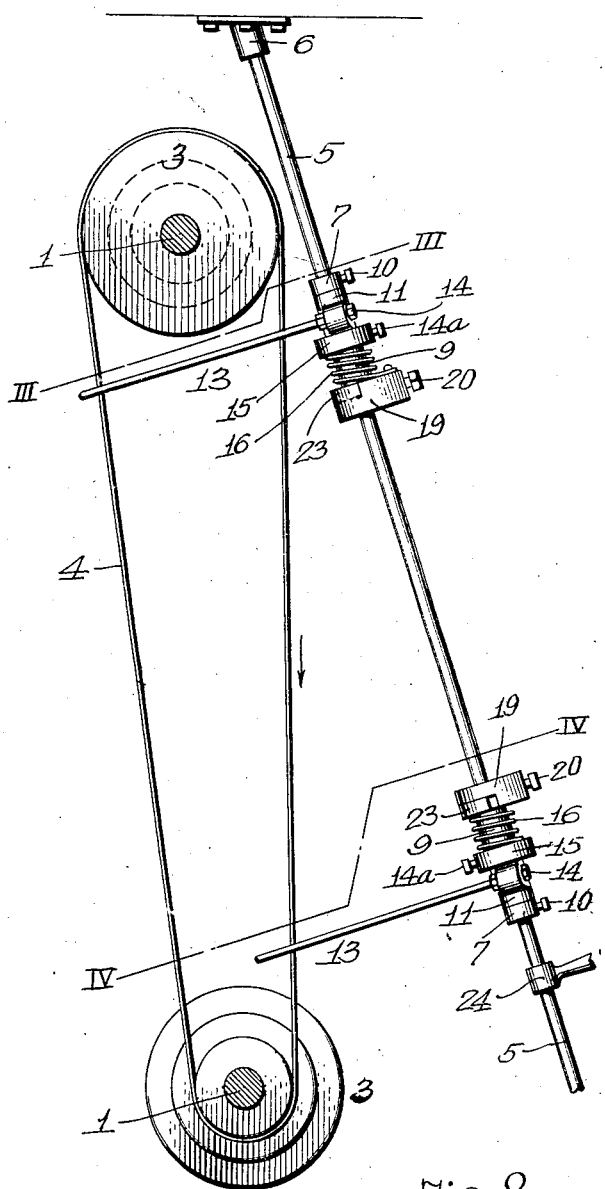

In practice, it may be necessary to dispose the rotatable upright 5 at an angle, as shown in Fig. 2, and said upright is provided with a crank or handle 24 so that it may be rocked or partially rotated. The upper arm 15 which serves the cone pulley 2 is shaped to provide clearance for both strands of the belt 4, and said arm has an offset portion 25 to engage the rear strand of the belt and shift the same while the arm provides clearance for the front strand. The lower arm 13 associated with the cone pulley 3 simply engages the front strand of the belt, and the actuation of this lower arm lags to a certain extent relative to the operation of the upper arm 15, this being true when the belt 4 is shifted from the left to the right and the relative operations of the arms 13 is just the reverse when the belt is shifted from the right to the left.

When the upright 5 is rocked in a clockwise direction a positive movement is imparted to the sleeve 9 supporting the upper arm, and the belt is shifted off of the large end of the pulley toward the intermediate steps of the pulley. While this is taking place the spring of the sleeve 9 of the lower arm is being placed under greater tension, and the expansive force of this spring is sufficient to shift the lower arm 13 and move the belt on to the intermediate portion or step of the pulley 3. The shifting of the lower arm 13 does not positively take place until the belt has been moved by the upper arm, and this interval of time is sufficient for the belt 4 to lower and permit of its lower end being shifted over the intermediate portion or step of the pulley 3. As with all belt shifting devices, the rotary motion of the pulleys assist in mounting the belt thereon and to limit the oscillatory movement of the upright 5, one of the bearings 6 thereof may be provided with a suitable shoulder to be engaged by a stop pin on the rotatable upright.

From the foregoing, it will be observed that while one arm is being shifted the tension of the spring associated with the other arm is gradually placed under further tension so that the last mentioned arm may be shifted after or more slowly than the first mentioned arm and in this manner the belt is handled so that it may readily ride on to the desired stepped portions of the pulley.

While in the drawing there is illustrated a preferred embodiment of our invention, it is to be understood that the structural elements are susceptible to such variations and modifications as fall within the scope of the appended claims.

What we claim is:—

1. A belt shifting device comprising a rotatable upright, belt engaging arms, and means connecting said arms to said upright so that one arm may be operated in advance of the other arm, said means including an arm support on said upright, and a collar on said upright adapted to engage and shift said arm support.

2. A belt shifting device comprising a rotatable upright, arm supports loose on said upright, arms carried by said supports and adapted to engage a belt, collars fixed on said upright, and a yieldable connection between said collars and said arm supports adapted to permit of one arm support being actuated in advance of the other.

3. A belt shifting device comprising a rotatable upright, an arm support loose on said upright, a belt engaging arm carried by said support, a collar fixed on said upright, and means articulating said collar and said arm support so that said arm support is moved simultaneously with said collar when said upright is rotated in one direction and said collar permitted to move with said upright in advance of said arm support when said upright is rotated in an opposite direction.

In testimony whereof I affix my signature in presence of two witnesses.

FRANK W. SIREN.

Witnesses:
 KARL H. BUTLER,
 G. E. McGRANN

In testimony whereof I affix my signature in the presence of two witnesses.

EMIL TAVASTILA.

Witnesses:
 AUGUST SIREN,
 GUSTAF SIREN.